(12) United States Patent
Miyamoto et al.

(10) Patent No.: US 8,930,056 B2
(45) Date of Patent: Jan. 6, 2015

(54) CONTROL APPARATUS AND CONTROL METHOD OF MOTIVE POWER APPARATUS FOR HYBRID VEHICLE

(71) Applicants: Tomohiko Miyamoto, Toyota (JP); Mamoru Kuramoto, Toyota (JP)

(72) Inventors: Tomohiko Miyamoto, Toyota (JP); Mamoru Kuramoto, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/963,535

(22) Filed: Aug. 9, 2013

(65) Prior Publication Data
US 2014/0058599 A1 Feb. 27, 2014

(30) Foreign Application Priority Data
Aug. 24, 2012 (JP) ................................. 2012-184751

(51) Int. Cl.
*B60L 9/00* (2006.01)
*B60W 20/00* (2006.01)
*B60W 10/08* (2006.01)

(52) U.S. Cl.
CPC .............. *B60W 20/108* (2013.01); *B60W 10/08* (2013.01); *B60W 20/10* (2013.01); *Y10S 903/903* (2013.01); *B60W 2510/087* (2013.01); *B60W 2550/13* (2013.01); *B60W 2710/083* (2013.01)
USPC .......................... 701/22; 180/65.285; 903/903

(58) Field of Classification Search
CPC ... B60W 20/10; B60W 20/108; B60W 10/08; B60W 2510/087; B60W 2550/13; B60W 2710/083; Y10S 903/903
USPC .......................... 701/22; 180/65.285; 903/903
See application file for complete search history.

(56) References Cited

U.S. PATENT DOCUMENTS

| | | | | |
|---|---|---|---|---|
| 5,606,212 A | * | 2/1997 | Sasa et al. | 310/270 |
| 2009/0160247 A1 | * | 6/2009 | Nakamura et al. | 307/9.1 |

FOREIGN PATENT DOCUMENTS

| | | |
|---|---|---|
| JP | A-2007-203975 | 8/2007 |
| JP | A-2008-247155 | 10/2008 |
| JP | A-2010-124594 | 6/2010 |
| JP | A-2010-252572 | 11/2010 |
| JP | A-2011-6020 | 1/2011 |
| JP | B2-4639916 | 2/2011 |
| JP | A-2013-059160 | 3/2013 |

* cited by examiner

*Primary Examiner* — Gertrude Arthur Jeanglaude
(74) *Attorney, Agent, or Firm* — Oliff PLC

(57) ABSTRACT

In a control of a motive power apparatus for a hybrid vehicle, the coil temperatures of first and second rotary electric machines and an air pressure index value are acquired, and upper limit values of the outputs of the machines are determined on the basis of the values acquired. If the output of one of the machines is restricted by the determined upper limit value of the output, the output of the other is increased. Alternatively, the upper limit values of the outputs of rotary electric machines are determined by applying the acquired coil temperatures to a relation between the coil temperature and the upper limit value of the output which relation is set for each air pressure index value. If the output of one of the first and the second rotary electric machines is restrained by the determined upper limit values, the output of the other is increased.

8 Claims, 4 Drawing Sheets

CONTROL APPARATUS AND CONTROL METHOD OF MOTIVE POWER APPARATUS FOR HYBRID VEHICLE

INCORPORATION BY REFERENCE

The disclosure of Japanese Patent Application No. 2012-184751 filed on Aug. 24, 2012 including the specification, drawings and abstract is incorporated herein by reference in its entirety.

BACKGROUND OF THE INVENTION

1. Field of the Invention

The invention relates to control of a motive power apparatus for a hybrid vehicle equipped with a plurality of kinds of prime movers that include a rotary electric machine.

2. Description of Related Art

A hybrid vehicle equipped with an internal combustion engine and a rotary electric machine as prime movers for driving the vehicle is known. In this specification, the term "rotary electric machine" is used as a collective term for electric motors, electric generators, and electric appliances that function as both an electric motor and an electricity generator. A rotary electric machine has coils that have been obtained by winding conductive wires. A conductive wire of such a coil has on its surface a coat layer of an electrical insulator, which achieves electrical insulation between conductive wires or between coil windings. However, if the potential difference between adjacent conductive wires exceeds an insulation permissible voltage of the coat layer, electric discharge between conductive wires starts.

The electrical insulation permissible voltage of the coil, that is, the electric discharge-starting voltage, changes depending on the temperature of the coils and the ambient air pressure. Japanese Patent Application Publication No. 2010-252572 (JP 2010-252572 A) describes an art in which electrical insulation of a coil is secured by controlling the electric power to be supplied to a rotary electric machine or the electric power generated by a rotary electric machine on the basis of the coil temperature and the ambient air pressure.

SUMMARY OF THE INVENTION

If the output of a rotary electric machine is restricted in order to secure the electric insulation of a coil, the motive power performance of the vehicle declines.

The invention secures the electrical insulation of the coils of a rotary electric machine in a motive power apparatus for a hybrid vehicle by restraining the output of the rotary electric machine on the basis of the temperature of the coils and the ambient air pressure, and also restrains decrease in the output of the motive power apparatus as a whole even when the output of the rotary electric machine is restrained.

A first aspect of the invention relates to a control apparatus of a motive power apparatus for a hybrid vehicle. The motive power apparatus has a first rotary electric machine, a second rotary electric machine, an internal combustion engine, and a planetary gear mechanism having a first element, a second element, and a third element connected to a driving wheel. The control apparatus includes an index value acquisition unit, a first temperature acquisition unit, a second temperature acquisition unit and a controller. The index value acquisition unit is configured to acquire a value of air pressure index that correlates with air pressure. The first temperature acquisition unit is configured to acquire a first coil temperature of the first rotary electric machine. The first rotary electric machine is connected to the internal combustion engine and the first element. The second temperature acquisition unit is configured to acquire a second coil temperature of the second rotary electric machine connected to the second element. The controller is configured to determine an upper limit value of output based on the acquired first coil temperature, the acquired second coil temperature and the acquired value of the air pressure index. The controller is configured to increase the output of one of the first rotary electric machine and the second rotary electric machine if the output of another one of the first rotary electric machine and the second rotary electric machine is restrained by the determined upper limit value of the output.

In the above-described control apparatus, the controller may be configured to determine the upper limit value of the output by i) determining an electric discharge-starting voltage based on the acquired first coil temperature, the second acquired coil temperature and the acquired value of the air pressure index, and ii) applying the determined electric discharge-starting voltage, the acquired first coil temperature and the acquired second coil temperature to a relation between the electric discharge-starting voltage and the upper limit value of the output, and the relation may be set for each coil temperature.

A second aspect of the invention relates to a control apparatus of a motive power apparatus for a hybrid vehicle. The motive power apparatus includes a first rotary electric machine, a second rotary electric machine, an internal combustion engine, and a planetary gear mechanism having a first element, a second element, and a third element connected to a driving wheel. The control apparatus includes an index value acquisition unit, a first temperature acquisition unit, a second temperature acquisition unit and a controller. The index value acquisition unit is configured to acquire a value of air pressure index that correlates with air pressure. The first temperature acquisition unit is configured to acquire a first coil temperature of the first rotary electric machine. The first rotary electric machine is connected to the internal combustion engine and the first element. The second temperature acquisition unit is configured to acquire a second coil temperature of the second rotary electric machine connected to the second element. The controller is configured to determine an upper limit value of output of each of the first rotary electric machine and the second rotary electric machine by applying the acquired first coil temperature and the acquired second coil temperature to a relation between coil temperature and the upper limit value of the output, and the relation may be set for each value of the air pressure index. The controller is configured to increase the output of one of the first rotary electric machine and the second rotary electric machine if the output of another one of the first rotary electric machine and the second rotary electric machine is restrained by the determined upper limit value of the output.

A third aspect of the invention relates to a control method of a motive power apparatus for a hybrid vehicle. The motive power apparatus includes a first rotary electric machine, a second rotary electric machine, an internal combustion engine, and a planetary gear mechanism having a first element, a second element, and a third element connected to a driving wheel. The control method includes: acquiring a value of air pressure index that correlates with air pressure; acquiring a first coil temperature of the first rotary electric machine connected to the internal combustion engine and to the first element; acquiring a second coil temperature of the second rotary electric machine connected to the second element; determining an upper limit value of output based on the acquired first coil temperature, the acquired second coil temperature and the acquired value of the air pressure index; and increasing the output of one of the first rotary electric machine and the second rotary electric machine if the output of another one of the first rotary electric machine and the second rotary electric machine is restrained by the determined upper limit value of the output.

A fourth aspect of the invention relates to a control method of a motive power apparatus for a hybrid vehicle. The motive power apparatus includes a first rotary electric machine, a second rotary electric machine, an internal combustion engine, and a planetary gear mechanism having a first element, a second element, and a third element connected to a driving wheel. The control method includes: acquiring a value of air pressure index that correlates with air pressure; acquiring a first coil temperature of the first rotary electric machine connected to the internal combustion engine and to the first element; acquiring a second coil temperature of the second rotary electric machine connected to the second element; determining an upper limit value of output of each of the first rotary electric machine and the second rotary electric machine by applying the acquired first coil temperature or the acquired second coil temperature to a relation between coil temperature and the upper limit value of the output, and the relation is set for each value of the air pressure index; and increasing the output of one of the first rotary electric machine and the second rotary electric machine if the output of another one of the first rotary electric machine and the second rotary electric machine is restrained by the determined upper limit value of the output.

Decline in the output of the motive power apparatus as a whole is restrained by increasing the output of a rotary electric machine when the output of another rotary electric machine is restricted in order to secure the electrical insulation of the coils.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
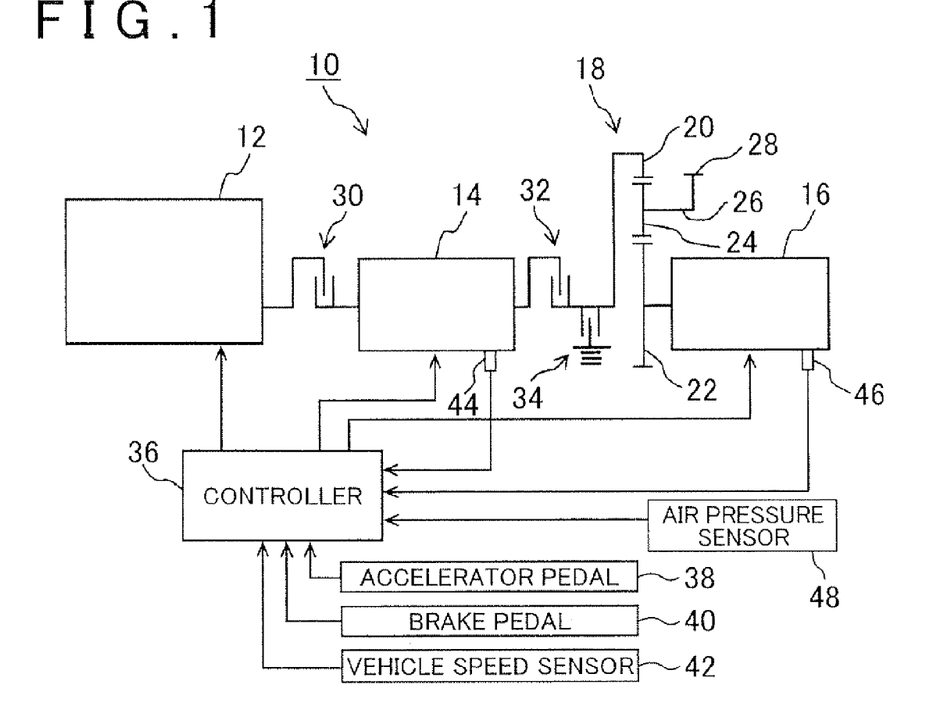
FIG. 1 is a block diagram showing a construction of a motive power apparatus for a hybrid vehicle in accordance with the invention.

Embodiments of the invention will be described below with reference to the drawings. FIG. 1 is a block diagram showing a general construction of a motive power apparatus 10 for a hybrid vehicle. The motive power apparatus 10 has three prime movers, one of which is an internal combustion engine 12 and the other two of which are rotary electric machines 14 and 16. The internal combustion engine 12 may be, for example, an otto engine or a diesel engine.

The two rotary electric machines 14 and 16 may be any type of rotary electric machine, such as an induction machine, a DC machine, a synchronous machine, etc. In this embodiment, a permanent magnet type rotary electric machine whose rotor is provided with permanent magnets is employed. This type of rotary electric machine has a stator that forms a rotating magnetic field that interacts with the permanent magnets of the rotor. The stator has, for example, a generally hollow cylindrical or circular annular shape, and is disposed so as to surround the rotor. The stator has, on a surface thereof that faces the permanent magnets of the rotor, magnetic poles that are arranged in the circumferential direction. On the individual magnetic poles, coils are formed by winding conductive wires. By supplying the coils with predetermined electric power, a rotating magnetic field is produced.

The two rotary electric machines are respectively connected to two of the three elements of a planetary gear mechanism 18. The other one of the three elements is connected to driving wheels. In this embodiment, a rotary electric machine 14 of the two rotary electric machines is connected to a ring gear 20 of the planetary gear mechanism 18, and the other rotary electric machine 16 is connected to a sun gear 22. Hereinafter, the rotary electric machine connected to the ring gear 20 will be termed the first rotary electric machine 14, and the rotary electric machine connected to the sun gear 22 will be termed the second rotary electric machine 16. Then, a carrier 26, that is, the third element of the planetary gear mechanism 18 which rotatably supports planetary pinions 24 that mesh with both the ring gear 20 and the sun gear 22, serves as an output element. For example, an output gear 28 is coupled to the carrier 26, and motive power is transferred from the output gear 28 to the driving wheels via a gear train, a differential apparatus, etc. When regenerative braking is performed, the input from the carrier 26 is transferred to at least one of the two rotary electric machines, whereby electricity is generated.

A first clutch 30 is provided between an output shaft (crankshaft) of the internal combustion engine 12 and an output shaft (rotor shaft) of the first rotary electric machine 14. When the first clutch 30 is connected, the output shaft of the internal combustion engine 12 and the output shaft of the first rotary electric machine 14 rotate together as an integral unit. When the first clutch 30 is disconnected, the first rotary electric machine 14 and the internal combustion engine 12 are able to operate independently of each other. A second clutch 32 and a brake 34 are provided between the first rotary electric machine 14 and the ring gear 20. When the second clutch 32 is connected, the first rotary electric machine 14 and the ring gear 20 rotate integrally as one unit. On the other hand, when the second clutch 32 is disconnected, the ring gear 20 and the first rotary electric machine 14 are cut off from each other. By engaging the brake 34, the ring gear 20 can be fixed so as not to rotate.

The motive power apparatus 10 has a controller 36 that controls the actions or operation of the internal combustion engine 12, the first and second rotary electric machines 14 and 16, the first and second clutches 30 and 32 and the brake 34. The controller 36 acquires information about demand of the driver, the state of travel of the vehicle, the state of operation of the motive power apparatus 10. On the basis of these acquired pieces of information, the controller 36 performs controls. Information about the demand of the driver can be acquired on the basis of, for example, the operation or the amount of operation of an operating element that the driver uses, such as an accelerator pedal 38, a brake pedal 40, etc. Information about the state of travel of the vehicle can be acquired via, for example, a vehicle speed sensor 42 that detects the traveling speed of the vehicle. Furthermore, it is also possible to acquire information as to whether the vehicle is traveling on a slippery road surface by comparing the rotation speeds of the road wheels. Information about the state of operation of the motive power apparatus 10 can be acquired from various sensors that are provided at predetermined sites of the motive power apparatus 10. Examples of such sensors include a temperature sensor that detects the cooling liquid temperature for the internal combustion engine 12 and the first and second rotary electric machines 14 and 16, a sensor that detects the pressure in an intake pipe of the internal combustion engine 12, a sensor that detects the concentration of oxygen or the like in exhaust gas, etc. Furthermore, the amount of electricity stored in a secondary battery that supplies electric power to the two rotary electric machines 14 and 16 is also acquired as information that indicates the state of operation of the motive power apparatus 10. The devices that acquire information that is input to the controller 36 as well as the controller 36 constitute a control apparatus of the motive power apparatus 10.

In order to acquire information about the temperature of the coils, temperature sensors are provided for the coils, that is, in contact with the conductive wires that form the coils, in this embodiment. The temperature sensor provided for the first rotary electric machine 14 will be termed the first temperature sensor 44, and the temperature sensor provided for the second rotary electric machine 16 will be termed the second temperature sensor 46. The coil temperatures detected by the first and second temperature sensors 44 and 46 are sent to the controller 36.

For a layout reason, a temperature sensor sometimes cannot be provided in direct contact with a coil. In such a case, it is possible to provide an arrangement such that the coil temperature can be estimated on the basis of the temperature of another portion of the rotary electric machine which has correlation with the coil temperature, for example, the temperature of a cooling liquid that cools the rotary electric machine. The cooling liquid may be provided so as to serve also as a lubricating oil. Sensors for detecting the cooling liquid temperature are provided respectively for the first and second rotary electric machines 14 and 16. A correspondence relation between the temperatures detected by these sensors and the coil temperatures at the times of detection are pre-stored in the form of correspondence table data in the controller 36. Therefore, the controller 36 calculates the coil temperature from the pre-stored correspondence relation and a detected temperature of the cooling liquid. In this specification, for the sake of simple description, a simple term "coil temperature" is used, but the "coil temperature" includes not only the coil temperature but also the temperatures of other sites that correlate with the coil temperature. Thus, a device that acquires information about the coil temperature or the temperature of another site or portion (other than the coil) that correlates with the coil temperature or a device that estimates the coil temperature is an example of the "first temperature acquisition unit" or the "second temperature acquisition unit" in the invention.

The control apparatus of the motive power apparatus 10 further has an air pressure sensor 48 that detects the ambient air pressure. The air pressure is a factor that affects the electrical insulation of the coils as described below. The controller 36 controls the outputs of the two rotary electric machines 14 and 16 so as to secure the electrical insulation of the coils on the basis of the air pressure and the temperatures of the two rotary electric machines 14 and 16. Although in this embodiment, the value of air pressure is directly acquired by an air pressure sensor 48, it is also possible to employ an index that correlates with the air pressure, for example, altitude, as an index that substitutes for the air pressure. The altitude can be obtained by utilizing a satellite positioning system such as the GPS (Global Positioning System) or the like. Alternatively, information about the altitude of the vehicle can be obtained by pre-storing map information that includes altitude, and acquiring the position of the vehicle on a map through the use of a self-contained navigation system, such as the inertial navigation system or the like, or through the use of the self-contained navigation system in combination with the satellite positioning system. Such altitude acquisition devices or such air pressure sensors are examples of an "index value acquisition unit" provided in the invention.

The motive power apparatus 10 is able to realize various operation modes by controlling actions of the first and second clutches 30 and 32 and the brake 34. One of the operation modes is a mode in which the motive power apparatus 10 is caused to function as a series hybrid system. By disengaging the second clutch 32, the internal combustion engine 12 and the first rotary electric machine 14 can be operated in a state of being cut off from the driving wheels. By connecting the first clutch 30, the first rotary electric machine 14 can be driven by the internal combustion engine 12 so that the first rotary electric machine 14 operates as an electricity generator. The electric power thus generated can be stored in the secondary battery (not shown). Furthermore, using the electric power thus generated, the second rotary electric machine 16 can be driven to move or travel the vehicle. On this occasion, the brake 34 is engaged to fix the ring gear 20.

In a mode in which the motive power apparatus 10 is caused to function as a parallel hybrid system, the first and second clutches 30 and 32 are engaged and the brake 34 is released. The internal combustion engine 12 is connected to the ring gear 20 via the first rotary electric machine 14, so that the internal combustion engine 12 and one or both of the first and second rotary electric machines 14 and 16 can be used to drive the vehicle. In this mode, the first rotary electric machine 14 can be operated as an electricity generator to charge the secondary battery.

Furthermore, when the motive power apparatus 10 is to be operated in an electric drive mode, the second clutch 32 is disconnected and the brake 34 is engaged. Using electric power from the secondary battery, the second rotary electric machine 16 is driven to move the vehicle. Furthermore, the vehicle can also be driven by the first and second rotary electric machines 14 and 16. In this case, the first clutch is disconnected, the second clutch 32 is connected, and the brake 34 is released.

Figure 2:
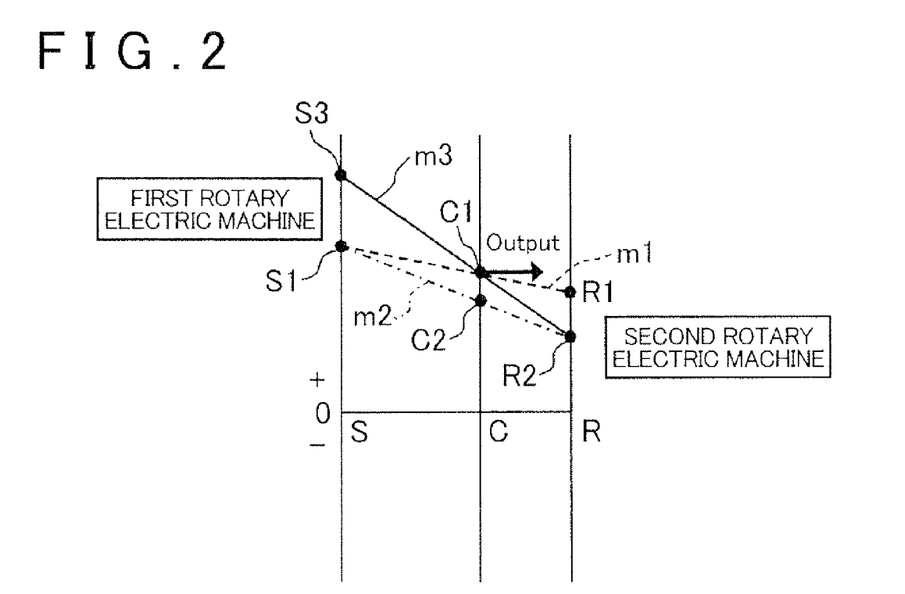
FIG. 2 is a diagram showing a relation among the outputs on three elements of a planetary gear mechanism.

FIG. 2 is a diagram showing a relation among the outputs on the three elements of the planetary gear mechanism 18. In FIG. 2, the outputs on the three elements are shown by vertical axes. An S axis shown on the left side in the diagram shows the output of the second rotary electric machine 16 connected to the sun gear 22, a C axis shown in the middle shows the output of the carrier 26, and an R axis on the right shows the output of the first rotary electric machine 14 and/or the internal combustion engine 12 connected to the ring gear 20. The output shown on the R axis is the sum of the output of the first rotary electric machine 14 and the output of the internal combustion engine 12. However, for the sake of ease in understanding, the case where only the first rotary electric machine 14 produces output will be described below.

The outputs on the three elements at a given time point exist on a straight line that crosses the three vertical axes in FIG. 2. That is, the outputs of the first and second rotary electric machines 14 and 16 that give a certain value of the output of the carrier 26 are represented by the intersection points (e.g., points R1, S1, R2, S3) of the S axis and the R axis with a straight line (e.g., straight lines m1, m3) that passes through a point on the C axis (e.g., a point C1) which represents the certain value of the output of the carrier 26. Therefore, the combinations of the outputs of the first and second rotary electric machines 14 and 16 that give a certain value of the output of the carrier 26 exist in infinite numbers. This can be utilized in the following fashion. That is, when the output of one of the two rotary electric machines needs to be restrained, it is possible to increase the output of the other rotary electric machine while maintaining the output of the motive power apparatus as a whole or without causing a large decline in the overall output.

A situation in which the output of the rotary electric machine needs to be restrained is a situation in which the temperature of the coil increases so that the electrical insulation between conductive wires of a coil cannot be secured (maintained) and electric discharge occurs. The securement (maintenance) of the electrical insulation of the coils (prevention of electric discharge) and the adjustment of the output of the motive power apparatus 10 will be explained below.

Figure 3:
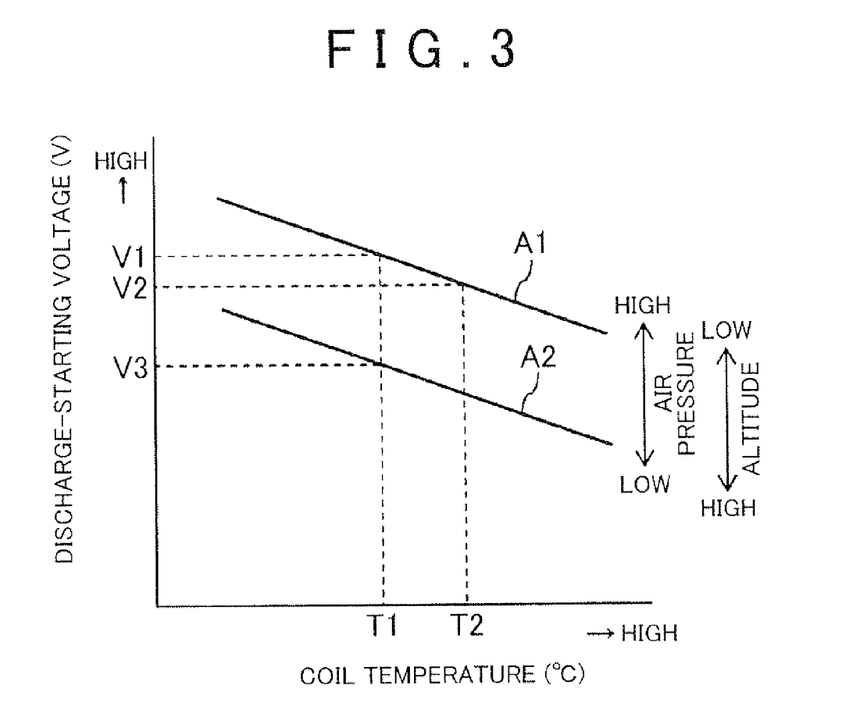
FIG. 3 is a diagram showing a relation among the coil temperature, the electric discharge-starting voltage and the air pressure index (air pressure, altitude)

FIG. 3 is a diagram schematically showing how the relation between the coil temperature and the electric discharge-starting voltage changes with changes in the index value (air pressure or altitude) of the air pressure. The following description will be made in conjunction with only the air pressure as the index value of the air pressure for the sake of ease in understanding. The electric discharge-starting voltage decreases with increases in the coil temperature if the air pressure is constant. In FIG. 3, a solid line A1 shows an example of the relation between the electric discharge-starting voltage and the coil temperature when the air pressure is high, and a solid line A2 shows an example of the relation therebetween when the air pressure is low. While the coil temperature remains the same, the electric discharge-starting voltage decreases if the air pressure decreases. Therefore, when the air pressure is low, for example, when the vehicle is on a high land, the electric discharge is likely to occur. In application to an actual control, the solid lines A1 and A2 in FIG. 3 can be set as lines that represent voltages that are slightly lower than the electric discharge-starting voltages, so that when the voltage is approaching a current one of the electric discharge-starting voltages, the process of restraining the output can be carried out with a good safety margin.

Figure 4:
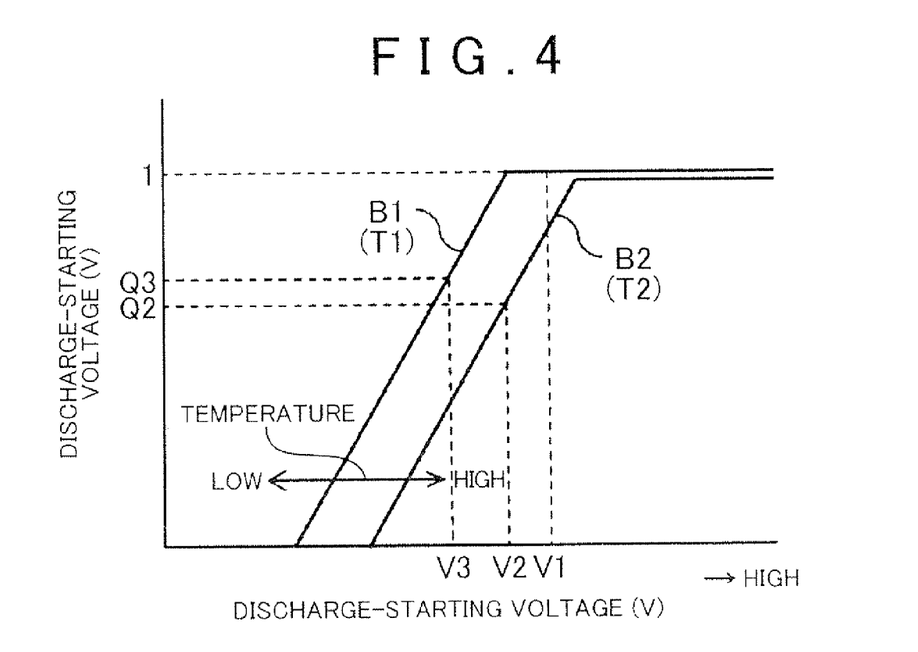
FIG. 4 is a diagram showing the load factor of a rotary electric machine, that is set on the basis of the electric discharge-starting voltage and the coil temperature.

FIG. 4 is a diagram schematically showing a relation between the output of the electric discharge-starting voltage and the output of a rotary electric machine. In FIG. 4, the vertical axis shows the ratio (load factor) of the output restricted by the coil temperature or the like to the output that can be produced according to the specifications. In the diagram, the bend lines show the load factor that can be set for the electric discharge-starting voltage of the rotary electric machine, and that determines the upper limit value of the output. When the load factor is 1 (=100%), the upper-limit output determined by the specification can be produced at most. When the load factor is less than 1, the output obtained by multiplying the output determined by the specification by the load factor can be produced at most. That is, the rotary electric machines are controlled so that the output thereof is less than or equal to the upper-limit value obtained by multiplying the output determined by the specification by the load factor. When the electric discharge-starting voltage of a rotary electric machine is high, the rotary electric machine can be operated at the upper-limit output determined by the specification. However, when the electric discharge-starting voltage becomes low, there arises a need to restrain the output of the rotary electric machine and therefore decrease the voltage applied to the coils in order to prevent occurrence of discharge (i.e., to secure (or maintain) the electrical insulation). Therefore, the upper limit value of the output is set so as to decrease with decreases in the electric discharge-starting voltage. Furthermore, since the electric discharge-starting voltage changes depending on the coil temperature as mentioned above, the upper limit value of the output of the rotary electric machine is determined for each value of the coil temperature. In FIG. 4, an example of the load factor that determines the upper limit value of the output of the rotary electric machine when the coil temperature is low is shown by a solid line B1, and an example of the load factor that determines the upper limit value of the output of the rotary electric machine when the coil temperature is high is shown by a solid line B2. In application to an actual control, the solid lines B1 and B2 in FIG. 4 can be set as lines regarding temperatures that are slightly lower than the coil temperature at which discharge starts, so that when the coil temperature becomes closer to the discharge-starting condition (temperature), the output restraining can be carried out with a good safety margin. In the correspondence relations shown in FIGS. 3 and 4, the setting with a good safety margin in either one of the relations will make it possible to perform the control on the discharge start condition.

The relations among the coil temperature, the air pressure and the electric discharge-starting voltage shown in FIG. 3 are pre-stored as correspondence table data in the controller 36. Furthermore, the relations among the electric discharge-starting voltage, the coil temperature and the upper limit value represented by the load factor shown in FIG. 4 are pre-stored as correspondence table data in the controller 36. The controller 36 acquires detected values provided by the first and second temperature sensors 44 and 46 and the air pressure sensor 48, and calculates an electric discharge-starting voltage for each of the first and second rotary electric machines 14 and 16 by applying the detected values to the correspondence table shown in FIG. 3. For example, when the coil temperature is T1 and the air pressure is a high air pressure indicated by the solid line A1, the electric discharge-starting voltage is calculated to be V1. The calculated electric discharge-starting voltage V1 is applied to the correspondence table shown in FIG. 4. In FIG. 4, the upper limit value of the output produced by the rotary electric machine at the time of the coil temperature T1 is assumed to be the value shown by the solid line B1. Since the coil temperature is T1 and the electric discharge-starting voltage is V1, the load factor is 1, that is, the output according to the specifications can be produced.

Likewise, when the coil temperature is T2 (>T1) and the air pressure is the high air pressure indicated by the solid line A1, the electric discharge-starting voltage is determined to be V2 in FIG. 3 and the load factor is determined to be Q2, which is less than 1, in FIG. 4. Hence, the upper limit value of the output of the rotary electric machine is restricted to or below the value obtained by multiplying the output determined by the specifications by the load factor Q2. Furthermore, when the coil temperature is T1 and the air pressure is a low air pressure indicated by the solid line A2 (<A1), the electric discharge-starting voltage is determined to be V3 in FIG. 3 and the load factor is determined to be Q3, which is less than 1, in FIG. 4.

The controller 36 monitors the electric discharge-starting voltages on the basis of the detected values provided by the first and second temperature sensors 44 and 46 and the air pressure sensor 48, and calculates the load factors corresponding to the discharge-starting voltages and the detected values, and then sets output upper limit values respectively for the first and second rotary electric machines commensurate with the load factors.

In this motive power apparatus 10, when the output of one of the two rotary electric machines is restricted on the basis of the air pressure and the coil temperature, the output of the motive power apparatus as a whole can be maintained by increasing the output of the other rotary electric machine.

Figure 5:
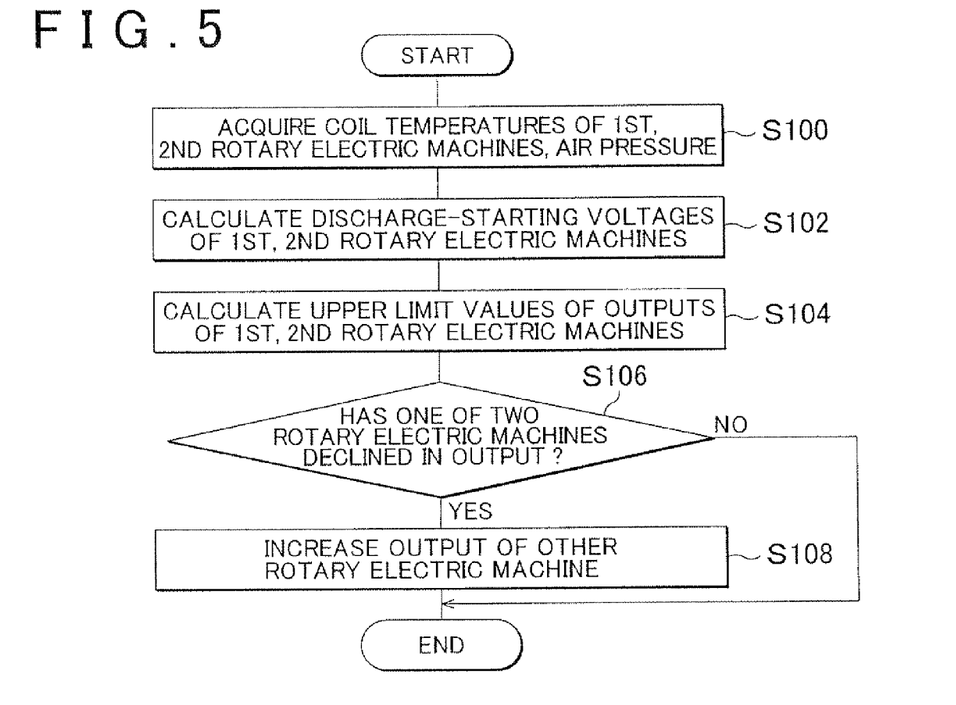
FIG. 5 is a flowchart showing an example of a control process concerned with prevention of electric discharge.

FIG. 5 is a flowchart of a process concerned with securement (or maintenance) of the electrical insulation of the coils of the rotary electric machines.

During an early period, the outputs (R1, C1 and S1) of the three elements of the planetary gear mechanism 18 are present on a straight line m1 (see FIG. 2). The controller 36 acquires values of the coil temperatures of the first and second rotary electric machines 14 and 16 via the first and second temperature sensors 44 and 46 (S100). Furthermore, the controller 36 acquires a value of the air pressure via the air pressure sensor 48 (S100). From the coil temperature values acquired and the air pressure value acquired, the controller 36 finds the present electric discharge-starting voltages of the first and second rotary electric machines 14 and 16 by using the correspondence table indicated in FIG. 3 (S102). From the electric discharge-starting voltages found, the controller 36 finds (calculates) load factors, and finds (calculates) upper limit values of the outputs that the first and second rotary electric machine can produce at the time (S104).

The controller 36 determines whether the output of at least one of the first and second rotary electric machines 14 and 16 calculated upon a demand of the driver or the like is greater than the upper limit value of the output of the rotary electric machine 14 or 16 (S106). If neither one of the output of the first rotary electric machine 14 and the output of the second rotary electric machine 16 is greater than a corresponding one of the upper limit values of the output, this flow ends. Furthermore, if both the output of the first rotary electric machines 14 and the output of the second rotary electric machine 16 are greater than their respective upper limit values, this flow also ends. If the calculated output of only one of the first and second rotary electric machines 14 and 16 is greater than the corresponding upper limit value of the output and therefore the output thereof is reduced, the output of the other rotary electric machine is increased (S108). For example, when the output of the first rotary electric machine 14 is reduced from R1 to R2 (see FIG. 2), the output of the second rotary electric machine 16 is increased from S1 to S3. By increasing the output of the second rotary electric machine 16 to S3, the output C1 of the carrier 26 is maintained.

Figure 6:
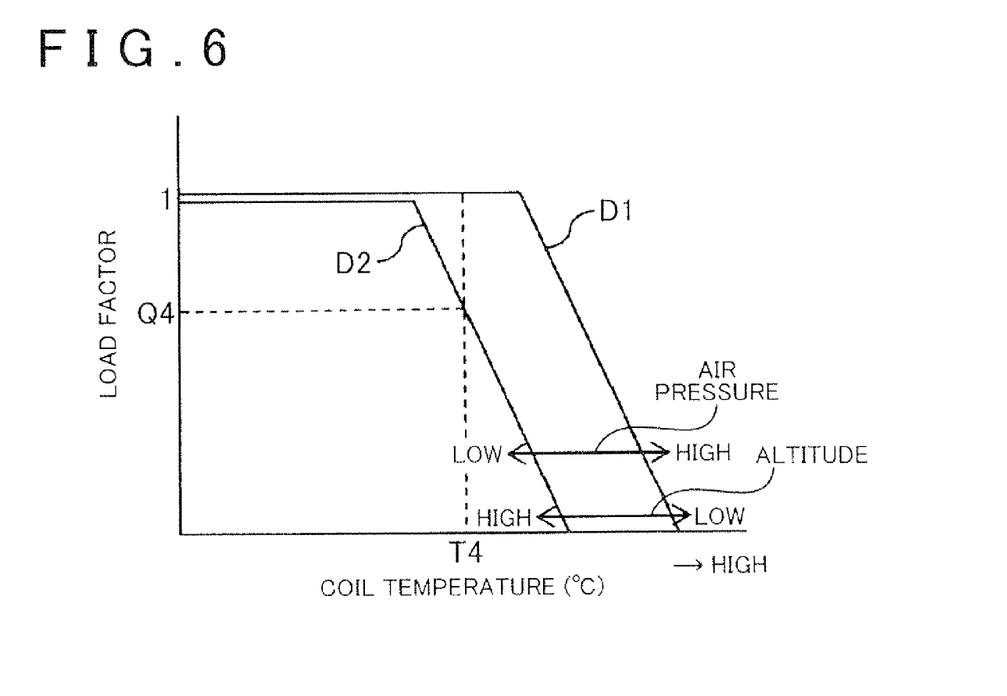
FIG. 6 is a diagram showing the load factor of a rotary electric machine that is set on the basis of the coil temperature and the air pressure index (air pressure, altitude)

FIG. 6 is a diagram for describing another setting technique for the upper limit values of the outputs of the rotary electric machines, which shows a relation among the coil temperature, the load factor and the air pressure. As described above in conjunction with FIG. 3, under the condition of constant air pressure, the electric discharge-starting voltage decreases if the coil temperature rises. In order to avoid electric discharge, when the coil temperature of a rotary electric machine is high, a control in which the upper limit value of the output of the rotary electric machine is restrained by reducing the load factor and therefore the voltage applied to the rotary electric machine is restrained is performed. Furthermore, as described above in conjunction with FIG. 3, if the air pressure lowers, the electric discharge-starting voltage decreases. That is, while the coil temperature remains the same, a control is performed such that, when the air pressure is low, the load factor becomes lower. In FIG. 6, solid lines D1 and D2 show load factors that avoid occurrence of electric discharge from the coils of the rotary electric machines, that is, load factors that determine the upper limit values of the outputs of the rotary electric machines for the purpose of securing the electrical insulation. The solid line D1 shows the correspondence between the coil temperature and the load factor when the air pressure is high, and the solid line D2 shows the correspondence between the coil temperature and the load factor when the air pressure is low. In FIG. 6, when the coil temperature of a rotary electric machine is T4 and the air pressure is high (D1), the load factor is 1, and if the air pressure becomes low (D2), the load factor decreases to Q4, so that the output of the rotary electric machine is restrained. The load factor shown in FIG. 6 can be set to a value with a good margin to the start of the discharge, as is the case with the correspondence tables indicated in FIGS. 3 and 4.

Figure 7:
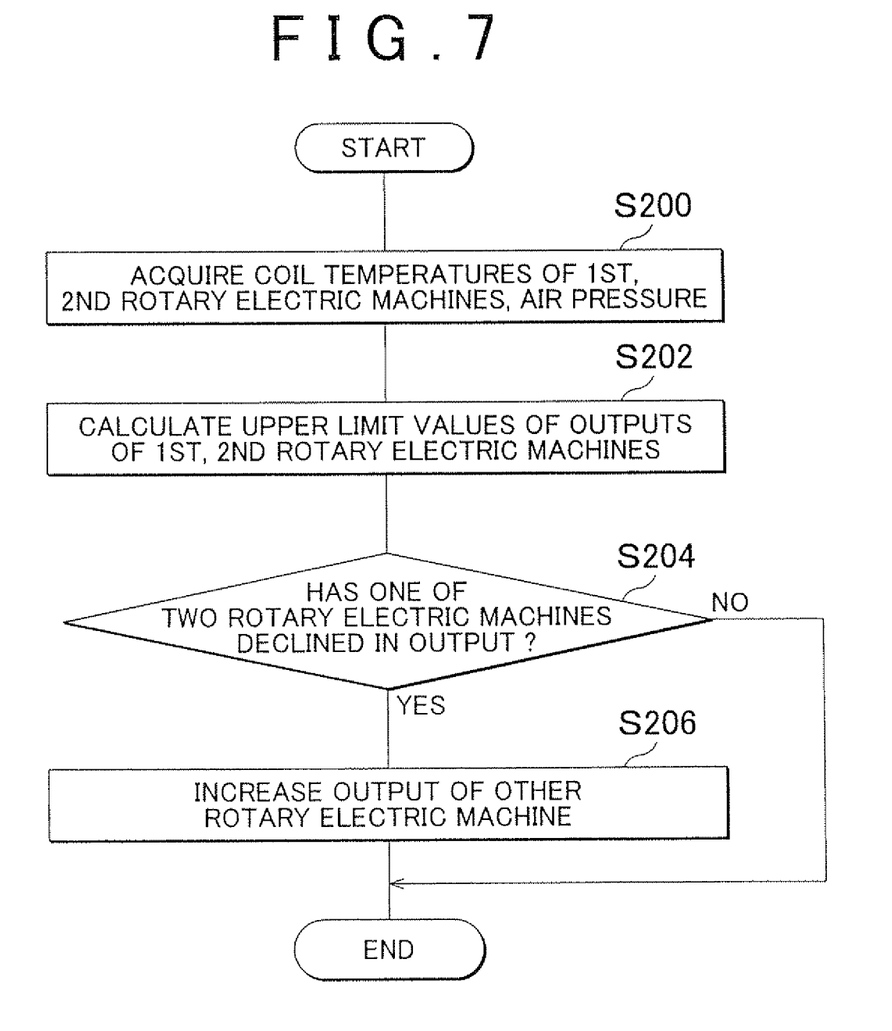
FIG. 7 is a flowchart showing another example of a control process concerned with prevention of electric discharge.

FIG. 7 is another example of the flowchart of the process concerned with securement of the electrical insulation of the coils of the rotary electric machines. In this example, the process is performed on the basis of the correspondence table indicated by FIG. 6. During an early period, the outputs (R1, C1 and S1) of the three elements of the planetary gear mechanism 18 exist on a straight line m1 (see FIG. 2). The controller 36 acquires values of the coil temperatures of the first and second rotary electric machines 14 and 16 via the first and second temperature sensors 44 and 46 (S200). Furthermore, the controller 36 also acquires a value of the air pressure via the air pressure sensor 48 (S200). The controller 36 finds a load factor by applying the coil temperatures acquired and the air pressure acquired to the correspondence table indicated by FIG. 6, and finds the upper limit values of the outputs that the first and second rotary electric machines can currently produce (S202).

The controller 36 then determines whether the outputs of the first and second rotary electric machines 14 and 16 calculated from the demand of the driver or the like are greater than their respective upper limit values of the outputs found (S204). If neither one of the output of the first rotary electric machine 14 and the output of the second rotary electric machine 16 is greater than a corresponding one of the upper limit values of the outputs, this flow is ended. Furthermore, if both the output of the first rotary electric machine 14 and the output of the second rotary electric machine 16 are both greater than their respective upper limit values of the outputs, this flow is ended. If the calculated output of only one of the first and second rotary electric machines 14 and 16 exceeds the upper limit value of the output of the rotary electric machine and therefore the output of the machine reduces, the output of the rotary electric machine is increased (S206). For example, if the output of the first rotary electric machine 14 is reduced from R1 to R2 (see FIG. 2), the output of the second rotary electric machine 16 is increased from S1 to S3. That is, by increasing the output of the second rotary electric machine 16 to S3, the output C1 of the carrier 26 is maintained.

Incidentally, which ones of the elements of the planetary gear mechanism are respectively connected to the two rotary electric machines and the driving wheels is not restricted by the foregoing embodiments or the like, but can be arbitrarily determined.

What is claimed is:

1. A control apparatus of a motive power apparatus for a hybrid vehicle including a first rotary electric machine, a second rotary electric machine, an internal combustion engine, and a planetary gear mechanism having a first element, a second element, and a third element connected to a driving wheel, the control apparatus comprising:

an index value acquisition unit configured to acquire a value of air pressure index that correlates with air pressure;

a first temperature acquisition unit configured to acquire a first coil temperature of the first rotary electric machine, the first rotary electric machine being connected to the internal combustion engine and the first element;

a second temperature acquisition unit configured to acquire a second coil temperature of the second rotary electric machine connected to the second element; and a controller configured to determine an upper limit value of output based on the acquired first coil temperature, the acquired second coil temperature and the acquired value of the air pressure index, the controller being configured to increase the output of one of the first rotary electric machine and the second rotary electric machine if the output of another one of the first rotary electric machine and the second rotary electric machine is restrained by the determined upper limit value of the output.

2. The control apparatus according to claim 1, wherein the controller is configured to determine the upper limit value of the output by i) determining an electric discharge-starting voltage based on the acquired first coil temperature, the acquired second coil temperature and the acquired value of the air pressure index, and ii) applying the determined electric discharge-starting voltage, the acquired first coil temperature and the acquired second coil temperature to a relation between the electric discharge-starting voltage and the upper limit value of the output, the relation being set for each coil temperature.

3. The control apparatus according to claim 1, wherein the controller is configured to determine the upper limit value of the output by applying the acquired first coil temperature, the acquired second coil temperature and the acquired value of the air pressure index to a relation between coil temperature and the upper limit value of the output, the relation being set for each value of the air pressure index.

4. A control apparatus of a motive power apparatus for a hybrid vehicle including a first rotary electric machine, a second rotary electric machine, an internal combustion engine, and a planetary gear mechanism having a first element, a second element, and a third element connected to a driving wheel, the control apparatus comprising:

an index value acquisition unit configured to acquire a value of air pressure index that correlates with air pressure;

a first temperature acquisition unit configured to acquire a first coil temperature of the first rotary electric machine, the first rotary electric machine being connected to the internal combustion engine and the first element;

a second temperature acquisition unit configured to acquire a second coil temperature of the second rotary electric machine connected to the second element; and a controller configured to determine an upper limit value of output of each of the first rotary electric machine and the second rotary electric machine by applying the acquired first coil temperature and the acquired second coil temperature to a relation between coil temperature and the upper limit value of the output, the relation being set for each value of the air pressure index, and the controller being configured to increase the output of one of the first rotary electric machine and the second rotary electric machine if the output of another one of the first rotary electric machine and the second rotary electric machine is restrained by the determined upper limit value of the output.

5. A control method of a motive power apparatus for a hybrid vehicle including a first rotary electric machine, a second rotary electric machine, an internal combustion engine, and a planetary gear mechanism having a first element, a second element, and a third element connected to a driving wheel, the control method comprising:

acquiring a value of air pressure index that correlates with air pressure;

acquiring a first coil temperature of the first rotary electric machine connected to the internal combustion engine and to the first element;

acquiring a second coil temperature of the second rotary electric machine connected to the second element;

determining an upper limit value of output based on the acquired first coil temperature, the acquired second coil temperature and the acquired value of the air pressure index; and increasing the output of one of the first rotary electric machine and the second rotary electric machine if the output of another one of the first rotary electric machine and the second rotary electric machine is restrained by the determined upper limit value of the output.

6. The control method according to claim 5, wherein the upper limit value of the output is determined by i) determining an electric discharge-starting voltage based on the acquired first coil temperature, the acquired second coil temperature and the acquired value of the air pressure index, and ii) applying the determined electric discharge-starting voltage, the acquired first coil temperature and the acquired second coil temperature to a relation between the electric discharge-starting voltage and the upper limit value of the output, the relation being set for each coil temperature.

7. The control method according to claim 5, wherein the upper limit value of the output is determined by applying the acquired first coil temperature, the acquired second coil temperature and the acquired value of the air pressure index to a relation between coil temperature and the upper limit value of the output, the relation being set for each value of the air pressure index.

8. A control method of a motive power apparatus for a hybrid vehicle including a first rotary electric machine, a second rotary electric machine, an internal combustion engine, and a planetary gear mechanism having a first element, a second element, and a third element connected to a driving wheel, the control method comprising:

acquiring a value of air pressure index that correlates with air pressure;

acquiring a first coil temperature of the first rotary electric machine connected to the internal combustion engine and to the first element;

acquiring a second coil temperature of the second rotary electric machine connected to the second element;

determining an upper limit value of output of each of the first rotary electric machine and the second rotary electric machine by applying the acquired first coil temperature and the acquired second coil temperature to a relation between coil temperature and the upper limit value of the output, the relation being set for each value of the air pressure index; and increasing the output of one of the first rotary electric machine and the second rotary electric machine if the output of another one of the first rotary electric machine and the second rotary electric machine is restrained by the determined upper limit value of the output.

* * * * *